(12) United States Patent
Sinn

(10) Patent No.: US 12,137,427 B2
(45) Date of Patent: Nov. 5, 2024

(54) METHOD AND APPARATUS FOR SIMPLE TIME SYNCHRONIZATION OF A COMMUNICATION IN INDUSTRIAL SETTINGS

(71) Applicant: SIEMENS AKTIENGESELLSCHAFT, Munich (DE)

(72) Inventor: Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 300 days.

(21) Appl. No.: 17/761,191

(22) PCT Filed: Sep. 15, 2020

(86) PCT No.: PCT/EP2020/075766
§ 371 (c)(1),
(2) Date: Mar. 16, 2022

(87) PCT Pub. No.: WO2021/052959
PCT Pub. Date: Mar. 5, 2021

(65) Prior Publication Data
US 2022/0369259 A1     Nov. 17, 2022

(30) Foreign Application Priority Data

Sep. 17, 2019 (EP) .................................. 19197777

(51) Int. Cl.
*H04W 56/00* (2009.01)
(52) U.S. Cl.
CPC .............................. *H04W 56/0015* (2013.01)
(58) Field of Classification Search
CPC .............................................. H04W 56/0015
See application file for complete search history.

(56) References Cited

U.S. PATENT DOCUMENTS 9,525,617 B2 * 12/2016 Vasseur ................. H04L 45/124
9,736,056 B2 *  8/2017 Vasseur ................. H04L 45/121
(Continued)

FOREIGN PATENT DOCUMENTS

| CN | 103002562 A | 3/2013 |
|----|-------------|--------|
| CN | 104184571 A | 12/2014 |

(Continued)

OTHER PUBLICATIONS

Rui et al.; "Design of precise clock synchronization in long distance digital pipeline system"; published: Feb. 15, 2013; vol. 35; No. 2. (4 pages).

(Continued)

*Primary Examiner* — Jay P Patel
(74) *Attorney, Agent, or Firm* — Lempia Summerfield Katz LLC

(57) ABSTRACT

For wireless communication in the industrial environment, there is, inter alia, an iWLAN protocol, which meets the requirements but provides no time synchronization in the data transmission. According to the invention, an additional—ideally wireless—channel is used for the synchronization. In an advantageous embodiment of the invention, a simple radio system is used for this. Pulses or telegrams for time synchronization are initiated directly from a unit, which is designed as hardware and which is responsible for the time synchronization and which has a highly accurate clock, or supplied on the side to be synchronized of such a unit. The radio system can be designed very simply and unidirectionally. The transmission process is started without delay in order to prevent variable delays.

19 Claims, 1 Drawing Sheet

(56) References Cited

U.S. PATENT DOCUMENTS

| | | | |
|---|---|---|---|
| 9,866,883 B2* | 1/2018 | Gurfinkel | H04N 21/2402 |
| 10,031,500 B1* | 7/2018 | Diaz | G05B 19/042 |
| 11,178,563 B2* | 11/2021 | Bahnasy | H04L 47/283 |
| 11,271,990 B2* | 3/2022 | Frank | G06F 8/60 |
| 11,974,238 B2* | 4/2024 | Van Phan | G05B 19/4155 |
| 2011/0009059 A1 | 1/2011 | Camp, Jr. et al. | |
| 2015/0319076 A1* | 11/2015 | Vasseur | H04L 45/124 |
| | | | 370/238 |
| 2015/0319077 A1* | 11/2015 | Vasseur | H04L 45/44 |
| | | | 370/238 |
| 2016/0119070 A1 | 4/2016 | Wang | |
| 2017/0353749 A1* | 12/2017 | Gurfinkel | H04N 21/242 |
| 2017/0359793 A1 | 12/2017 | Vachula | |
| 2018/0109409 A1 | 4/2018 | Kobayashi | |
| 2018/0253084 A1* | 9/2018 | Diaz | G05B 19/414 |
| 2019/0069009 A1* | 2/2019 | Gurfinkel | H04J 3/0682 |
| 2019/0351603 A1* | 11/2019 | Busch | B29C 49/4289 |
| 2020/0204611 A1* | 6/2020 | Frank | H04L 41/0893 |
| 2021/0144666 A1* | 5/2021 | Sivasiva Ganesan | |
| | | | H04W 56/0015 |
| 2021/0204230 A1* | 7/2021 | Van Phan | H04J 3/0667 |
| 2022/0045962 A1* | 2/2022 | Roeland | H04L 47/283 |
| 2022/0239600 A1* | 7/2022 | Varga | H04L 47/283 |
| 2024/0129869 A1* | 4/2024 | Van Phan | H04L 69/26 |

FOREIGN PATENT DOCUMENTS

| | | | | |
|---|---|---|---|---|
| CN | 107959967 A | 4/2018 | | |
| EP | 3157295 A1 | 4/2017 | | |
| WO | 2015143464 A1 | 10/2015 | | |
| WO | 2017213739 A1 | 12/2017 | | |
| WO | WO-2018158404 A1 * | 9/2018 | ......... | G05B 19/0421 |
| WO | WO-2019243669 A1 * | 12/2019 | ......... | G05B 19/4155 |
| WO | WO-2020192908 A1 * | 10/2020 | | |

OTHER PUBLICATIONS

European Search Report for European Application No. 19197777.6-1205 dated Mar. 17, 2020.
International Search Report and the Written Opinion for International Patent Application PCT/EP2020/075766 mailed Dec. 1, 2020.
Notification of the Submission of the International Provisional Patentability Report for International Patent Application No. PCT/EP2020/075766 mailed Nov. 10, 2021.

* cited by examiner

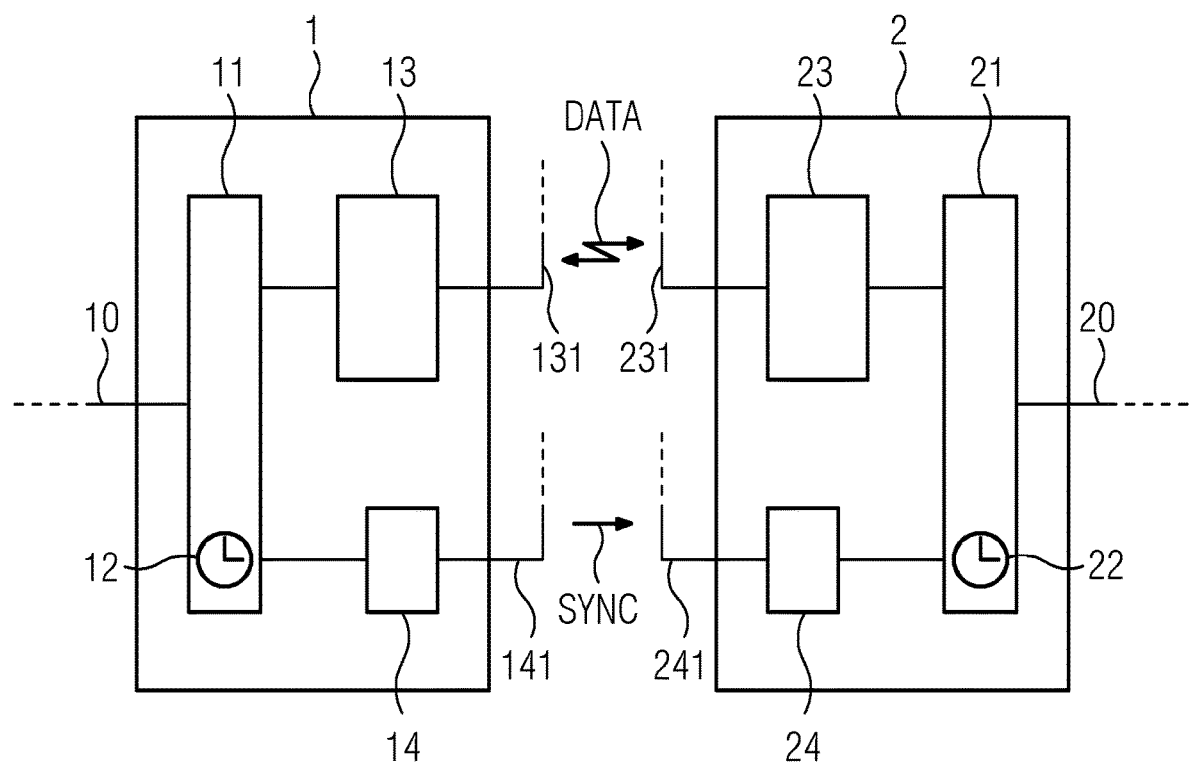

METHOD AND APPARATUS FOR SIMPLE TIME SYNCHRONIZATION OF A COMMUNICATION IN INDUSTRIAL SETTINGS

This application is the National Stage of International Application No. PCT/EP2020/075766, filed Sep. 15, 2020, which claims the benefit of European Patent Application No. EP 19197777.6, filed Sep. 17, 2019. The entire contents of these documents are hereby incorporated herein by reference.

BACKGROUND

The advancing digitization in industry would be inconceivable without modern communication technologies. Wireless solutions are in demand particularly for applications for which the laying of cables would be too complex or even impossible.

In order to provide companies with the best possible infrastructure for interchanging data of all types, special Industrial Wireless LAN (IWLAN) products having specific supplementary functions have been developed (e.g., for the specific demands of WLAN in industry).

For example, applications in automation, such as, for example, automobile manufacture, for transport and logistics, but also in the oil and gas industry, benefit from these.

A difference from the WLAN in widespread use in the private sector is the accurately timed transmission of the control and data sets, which is to be provided for use in industry in order to be able to reliably control machines. Additionally, such devices are configured for a wider temperature range of from −40° C. to +70° C. The network operates using a specific encryption method in order to prevent tampering.

Wireless communication via Industrial Wireless LAN (IWLAN) is already in use as a solution in many applications (e.g., for mobile network subscribers such as driverless transport systems or for crane applications). Not only the hardware but also the software of the devices are to meet special requirements in industry.

The rapid and reliable transmission of the data packets is to be provided in the communication for many instances of use; realtime communication based on the PROFINET and Ethernet/IP protocols may therefore be implementable without any problems.

If radio systems (e.g., based on WiFi) are used in realtime applications, clock time synchronization is often to be provided. This applies, for example, if the radio system is integrated in a bus system for realtime applications such as, for example, TSN or PROFINET.

Commercial WiFi systems are not optimally suited to accurate (e.g., highly accurate) time synchronization in the range of 1 µs and below, however.

Current systems provide functions for time synchronization only rudimentarily.

The functions specified in the underlying standards IEEE 802.11 and 802.1 are not completely specified to the full extent and may be understood only as support.

In current implementations, most time-critical functions are therefore provided either in hardware, and are thus unchangeable, or as firmware on an embedded microcontroller.

Further, the duration of the sequence of functions that are provided by software is not accurately predictable or measurable.

Accurate timing always requires direct access to counters or clocks implemented in hardware. Without this, more or less significant jitter always arises (e.g., the variance in the delay of the transmitted data packets). At present, it is possible to resort only to the functions that are provided by the manufacturer. However, the implementations are not disclosed for the most part and therefore may hardly be used by third parties.

At present, no commercial solutions for highly accurate clock time synchronization without the disadvantages outlined above are known in the technical setting described. Solutions are based on the propagation of the clock time while accepting greater latency (e.g., delay) and jitter. By way of example, the implementation using the Network Time Protocol (NTP, RFC 5905 . . . ), a standard for synchronizing clocks in computer systems via packet-based communication networks, is known. NTP provides for a reference clock that acts as a fixed point for all synchronization processes. All clocks are thus oriented according to this clock or clock time. NTP was developed specifically in order to allow reliable time indication via networks with variable packet delay. However, the protocol is complex to implement and has vulnerabilities.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a communication method and a communication apparatus in the above-described setting of industrial wireless communication that are easy to implement are provided.

A method for time synchronization of a communication between communication elements in an industrial setting has a first wireless connection for an actual payload data transmission. Synchronization times are initiated directly by an HW unit that is responsible for the time synchronization and has a highly accurate clock, or are supplied to one such on the side to be synchronized. The synchronization times are converted into synchronization signals. A second transmission channel, which is different than the first wireless connection, is used to transmit the synchronization signals, and this second transmission channel is likewise in the form of a wireless connection.

A communication element for time synchronization of a communication in an industrial setting according to the present embodiments includes a first connecting element for setting up a first wireless connection for payload data transmission. The communication element also includes a first element for the time synchronization, which initiates synchronization times, or the synchronization times are supplied to one such on a side to be synchronized. The synchronization times are converted into synchronization signals. The communication element includes a highly accurate clock (e.g., a realtime clock) and a second connecting element for transmitting the synchronization signals via a second transmission channel that is different than the first wireless connection. This second transmission channel is likewise in the form of a wireless connection.

According to the present embodiments, an additional channel (e.g., wireless channel) is used for the synchronization. In one form of the present embodiments, a simple radio system is used for this.

The following are suitable as the parallel second channel, for example: Simple systems operating in the license-free frequency bands 868 MHz (e.g., based on the CC1100 from Texas Instruments) or 2.4 gigahertz (e.g., based on the CC2500 from Texas Instruments); 868 MHz—the duty cycle required is not a problem in the case of pulses; 2.4 GHz—no duty cycle at 10 mW max, no LBT required; Simple ultra-wideband (UWB) systems (e.g., in the frequency band 3-7 GHz); UWB systems may be used to produce very short pulses (e.g., picoseconds—a few nanoseconds), which allows very accurate synchronization; and Optical systems.

This is used to transmit synchronization times in the form of single pulses or short telegrams. This is possible both cyclically and acyclically.

BRIEF DESCRIPTION OF THE DRAWING

FIGURE shows one embodiment of a system.

DETAILED DESCRIPTION

FIG. 1 shows a system according to an embodiment with a transmitter 1 and a receiver 2 (e.g., elements). The elements 1 and 2 are each connected to further network elements that are not shown in FIGURE via a data bus 10, 20.

A first wireless connection is used to convey actual data DATA. For this purpose, the elements 1, 2 each have a corresponding transmission and reception device 13, 23 with a suitable antenna 131, 231. These come or go to a suitable communication interface 11, 21. An important aspect for the time synchronization is realtime clocks 12, 22, which are provided both for producing the synchronization clock cycles and for processing after reception.

According to the present embodiments, the units 1, 2 also have a second wireless transmission capability for the signals for time synchronization, 14, 24, which is separate from the first, data transmission capability and, as already shown above, may be in a technically very simple configuration. For example, it is sufficient if the time synchronization messages may be transmitted unidirectionally.

These pulses or telegrams for time synchronization are initiated directly by a unit embodied as hardware that is responsible for the time synchronization and has a highly accurate clock 12, 22, or are supplied to one such on a side to be synchronized. The radio system may be of very simple and unidirectional design. The transmission process is started without delay in order to avoid variable delays. By way of example, a mechanism analogous to listen-before-talk, also known as LBT, may be used (e.g., a check is performed before transmission to determine whether the transmission channel is currently being used by another transmitter).

The delay from the transmission apparatus (e.g., antenna) of the initiator to the reception apparatus of the receiver is therefore now only the pure signal propagation delay in the components and through the air. Should a variable delay in the transmission process (e.g., as a result of regulatory requirements) be unavoidable, the above hardware unit may determine the delay and use the value as a correction value itself or convey it via the actual radio system to the side to be synchronized.

Substantially in parallel with the synchronization pulse or telegram (e.g., shortly beforehand, at the same time, or shortly afterward) the first communication connection (e.g., WiFi) is used to transmit the exact time at which the synchronization signal was initiated. This is ascertained in the timing unit of the initiator and is transferred to the WiFi component. The receiver thus knows the time to which the received pulse may be attributed. Reception of the time and of the pulse may be confirmed to the transmitter. It is possible to distinguish between synchronization signals of different systems by transmitting the synchronization signals (e.g., on different frequencies and/or using different codings).

The present embodiments allow a tried-and-tested and commercially available radio technique such as, for example, WiFi or Bluetooth to be used for the actual data transmission, and highly accurate clock time synchronization to be incorporated still.

The highly accurate clock time synchronization facilitates the use of radio systems in realtime Ethernet systems such as TSN or PROFINET.

The hardware and software to be provided for transmitting pulses or simple telegrams is simple and cheaply available.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for time synchronization of a communication between communication elements in an industrial setting via a first wireless connection with realtime Ethernet systems based on TSN, the method comprising:
   initiating synchronization times directly by a hardware (HW) unit that is responsible for the time synchronization and has an accurate clock, or supplying the synchronization times to the HW unit on a side to be synchronized;
   converting the synchronization times into synchronization signals; and
   transmitting the synchronization signals using a second transmission channel, the second transmission channel being different than the first wireless connection,
   wherein the second transmission channel is in the form of a wireless connection,
   wherein a transmission process has a variable delay, and
   wherein the HW unit is configured to:
      determine a value of the variable delay; and
      use the value of the variable delay as a correction value for the synchronization signal or convey the value of the variable delay to a receiving communication element of the communication elements via a first radio system.

2. The method of claim 1, wherein the second transmission channel is configured as a simple radio system.

3. The method of claim 1, wherein the synchronization signals are transmitted in the form of single pulses.

4. The method of claim 1, wherein the synchronization signals are transmitted in the form of short telegrams.

5. The method of claim 1, wherein the first wireless connection operates according to the iWLAN standard.

6. The method of claim 1, wherein the synchronization signals are transmitted cyclically.

7. The method of claim 1, wherein the synchronization signals are transmitted acyclically.

8. The method of claim 1, wherein a transmission process of the synchronization signals is started without delay.

9. The method of claim 1, wherein a synchronization signal of the synchronization signals contains information concerning which transmitter sent the synchronization signal.

10. A communication element for time synchronization of a communication in an industrial setting with realtime Ethernet systems based on TSN, the communication element comprising:
- a first connecting element configured to set up a first wireless connection for payload data transmission;
- a first element for time synchronization, the first element being configured to:
  - initiate synchronization times or receive the synchronization times on a side to be synchronized; and
  - convert the synchronization times into synchronization signals;
- an accurate clock; and
- a second connecting element for transmitting the synchronization signals via a second transmission channel, the second transmission channel being different than the first wireless connection,
- wherein this second transmission channel is in the form of a wireless connection,
- wherein a transmission process has a variable delay, and
- wherein the first element is further configured to:
  - determine a value of the variable delay; and
  - use the value of the variable delay as a correction value for a synchronization signal of the synchronization signals or convey the value of the variable delay to a receiving communication element via a first radio system.

11. The communication element of claim 10, wherein the second transmission channel is configured as a simple radio system.

12. The communication element of claim 10, wherein the synchronization signals are transmitted via the second transmission channel in the form of single pulses.

13. The communication element of claim 10, wherein the synchronization signals are transmitted via the second transmission channel in the form of short telegrams.

14. The communication element of claim 10, wherein the first connecting element for the first wireless connection operates according to the iWLAN standard.

15. The communication element of claim 10, wherein the second connecting element is configured to perform a transmission process of the synchronization signals without delay.

16. The communication element of claim 15, wherein the second connecting element is configured to perform the transmission process of the synchronization signals without delay using a method based on listen-before-talk.

17. The communication element of claim 10, wherein the accurate clock is a realtime clock.

18. The communication element of claim 11, wherein the simple radio system is a radio system with unidirectional radio transmission.

19. The method of claim 2, wherein the second transmission channel is configured as a radio system with unidirectional radio transmission.

* * * * *